United States Patent
Doyle et al.

(10) Patent No.: US 10,671,451 B2
(45) Date of Patent: *Jun. 2, 2020

(54) IDEMPOTENT MODE OF EXECUTING COMMANDS TRIGGERED BY COMPLEX EVENT PROCESSING

(71) Applicant: Red Hat, Inc., Raleigh, NC (US)

(72) Inventors: Duncan Doyle, Amsterdam (NL); Edson Tirelli, Etobicoke (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,492

(22) Filed: Dec. 22, 2017

(65) Prior Publication Data

US 2018/0121266 A1     May 3, 2018

Related U.S. Application Data

(63) Continuation of application No. 14/618,262, filed on Feb. 10, 2015, now Pat. No. 9,891,966.

(51) Int. Cl.
*G06F 3/00* (2006.01)
*G06F 9/54* (2006.01)
*G06F 9/46* (2006.01)

(52) U.S. Cl.
CPC .............. *G06F 9/542* (2013.01); *G06F 9/466* (2013.01)

(58) Field of Classification Search
CPC ...................................................... G06F 9/542
USPC .......................................................... 719/318
See application file for complete search history.

(56) References Cited

U.S. PATENT DOCUMENTS

| | | |
|---|---|---|
| 5,475,681 A | 12/1995 | White et al. |
| 5,517,505 A | 5/1996 | Buchholz et al. |
| 5,691,917 A | 11/1997 | Harrison |
| 6,092,118 A | 7/2000 | Tsang |
| 6,324,495 B1 | 11/2001 | Steinman |
| 6,714,611 B1 | 3/2004 | Du et al. |
| 6,751,228 B1 | 6/2004 | Okamura |
| 6,810,405 B1 | 10/2004 | LaRue et al. |
| 6,993,246 B1 | 1/2006 | Pan et al. |

(Continued)

FOREIGN PATENT DOCUMENTS

| | | |
|---|---|---|
| EP | 2736002 | 5/2014 |
| WO | 2014118132 | 8/2014 |

OTHER PUBLICATIONS

Issa Traore, Dynamic Sample Size Detection in Learning Command Line Sequence for Continuous Authentication. (Year: 2012).*

(Continued)

*Primary Examiner* — Lechi Truong
(74) *Attorney, Agent, or Firm* — Lowenstein Sandler LLP (57) ABSTRACT

Systems and methods for enforcing the idempotent mode of executing commands triggered by complex event processing. An example method may comprise: receiving, by a processing device, an event data item comprising a value of a state variable; applying an event processing rule to the event data item, by evaluating a conditional statement comprising the value of the state variable, to generate an event processing command; producing a command identifier identifying the event processing command; and responsive to failing to insert the command identifier into a hash table employed for storing identifiers of executed commands, discarding the event processing command.

11 Claims, 4 Drawing Sheets

(56) References Cited

U.S. PATENT DOCUMENTS

| | | | |
|---|---|---|---|
| 7,818,370 | B2 | 10/2010 | Piper et al. |
| 8,214,795 | B2 | 7/2012 | Cheriton |
| 8,543,534 | B2 | 9/2013 | Alves et al. |
| 8,560,889 | B2 | 10/2013 | Behrendt et al. |
| 8,688,404 | B1 | 4/2014 | Levy |
| 8,756,049 | B2 | 6/2014 | Proctor |
| 8,775,389 | B2 | 7/2014 | Arcushin et al. |
| 8,825,848 | B1 | 9/2014 | Dotan et al. |
| 9,012,853 | B2 | 4/2015 | Gueorguiev et al. |
| 9,100,135 | B2 | 8/2015 | Tosti |
| 9,264,485 | B1* | 2/2016 | Ranganathan ........ H04L 67/10 |
| 9,380,068 | B2 | 6/2016 | Iyer et al. |
| 10,089,041 | B2* | 10/2018 | Peled ..................... G11B 5/09 |
| 2002/0065940 | A1 | 5/2002 | Suzuki et al. |
| 2002/0131398 | A1 | 9/2002 | Taylor |
| 2003/0040955 | A1* | 2/2003 | Anaya ............... G06Q 10/0637 |
| | | | 705/7.36 |
| 2003/0177154 | A1 | 9/2003 | Vrancic |
| 2004/0114607 | A1 | 6/2004 | Shay et al. |
| 2004/0249856 | A1 | 12/2004 | Garden et al. |
| 2005/0044351 | A1 | 2/2005 | Harvey |
| 2005/0169233 | A1 | 8/2005 | Kandala et al. |
| 2005/0182856 | A1 | 8/2005 | McKnett |
| 2005/0192846 | A1 | 9/2005 | De Zwart et al. |
| 2006/0036722 | A1 | 2/2006 | Larkin et al. |
| 2006/0101130 | A1 | 5/2006 | Adams et al. |
| 2006/0101447 | A1 | 5/2006 | Koch |
| 2006/0150246 | A1 | 7/2006 | Kamada et al. |
| 2006/0218535 | A1 | 9/2006 | Delmonte et al. |
| 2007/0168990 | A1 | 7/2007 | Alshab et al. |
| 2008/0086489 | A1 | 4/2008 | Wilkes |
| 2008/0125146 | A1 | 5/2008 | Bainbridge |
| 2008/0196006 | A1 | 8/2008 | Bates et al. |
| 2008/0209078 | A1 | 8/2008 | Bates et al. |
| 2008/0243463 | A1 | 10/2008 | Lovas et al. |
| 2009/0158075 | A1 | 6/2009 | Biberstein et al. |
| 2009/0217050 | A1 | 8/2009 | Amiel et al. |
| 2009/0225676 | A1* | 9/2009 | Kisela .................... H04L 1/24 |
| | | | 370/252 |
| 2010/0034539 | A1 | 2/2010 | Ko et al. |
| 2010/0042573 | A1 | 2/2010 | Wenig et al. |
| 2010/0100520 | A1 | 4/2010 | Dargue et al. |
| 2010/0169695 | A1 | 7/2010 | Jurgilewicz et al. |
| 2010/0175076 | A1 | 7/2010 | Acedo et al. |
| 2010/0177763 | A1 | 7/2010 | Van Der Stok et al. |
| 2010/0235879 | A1 | 9/2010 | Burnside et al. |
| 2011/0006818 | A1 | 1/2011 | Takagi et al. |
| 2011/0040708 | A1 | 2/2011 | Tirelli et al. |
| 2011/0040709 | A1 | 2/2011 | Proctor et al. |
| 2011/0078288 | A1 | 3/2011 | Chen |
| 2011/0202496 | A1 | 8/2011 | Klinger et al. |
| 2011/0228834 | A1 | 9/2011 | Umayabashi et al. |
| 2011/0246223 | A1 | 10/2011 | Rundensteiner et al. |
| 2012/0010857 | A1 | 1/2012 | Richter et al. |
| 2012/0016831 | A1 | 1/2012 | Proctor |
| 2012/0030495 | A1 | 2/2012 | Chandhoke et al. |
| 2012/0089991 | A1 | 4/2012 | Scheerer et al. |
| 2012/0102362 | A1* | 4/2012 | Onitsuka ............ G06F 11/0727 |
| | | | 714/37 |
| 2012/0148248 | A1 | 6/2012 | Li |
| 2012/0219099 | A1 | 8/2012 | Loukianov |
| 2012/0246653 | A1 | 9/2012 | Boruhovski et al. |
| 2012/0257626 | A1* | 10/2012 | McGhee ............ H04L 45/7453 |
| | | | 370/392 |
| 2012/0265903 | A1* | 10/2012 | Peled ..................... G11B 5/09 |
| | | | 710/5 |
| 2012/0310850 | A1 | 12/2012 | Zeng et al. |
| 2012/0311562 | A1 | 12/2012 | Wang et al. |
| 2012/0331352 | A1 | 12/2012 | Guenther et al. |
| 2013/0005449 | A1 | 1/2013 | Ly |
| 2013/0019121 | A1 | 1/2013 | Ben-David et al. |
| 2013/0024567 | A1 | 1/2013 | Roxburgh et al. |
| 2013/0031112 | A1 | 1/2013 | Gunn et al. |
| 2013/0036419 | A1 | 2/2013 | Hazelet et al. |
| 2013/0046725 | A1 | 2/2013 | Cammert et al. |
| 2013/0085993 | A1 | 4/2013 | Li et al. |
| 2013/0266127 | A1 | 10/2013 | Schachter et al. |
| 2014/0021356 | A1 | 1/2014 | Zwaans et al. |
| 2014/0095535 | A1 | 4/2014 | Deshmukh et al. |
| 2014/0219269 | A1 | 8/2014 | Vleugels et al. |
| 2014/0280861 | A1* | 9/2014 | Anderson ............... H04L 67/22 |
| | | | 709/224 |
| 2014/0297800 | A1 | 10/2014 | Mutschler et al. |
| 2014/0334582 | A1 | 11/2014 | Bock et al. |
| 2014/0351703 | A1* | 11/2014 | Ujiie ....................... G06F 9/542 |
| | | | 715/733 |
| 2014/0365551 | A1 | 12/2014 | Mutschler et al. |
| 2015/0012667 | A1 | 1/2015 | Carlson et al. |
| 2015/0163048 | A1 | 6/2015 | Turnbull |
| 2015/0237464 | A1 | 8/2015 | Shumaker et al. |
| 2015/0317567 | A1 | 11/2015 | Lin |
| 2015/0363245 | A1 | 12/2015 | Mutschler |
| 2016/0033990 | A1 | 2/2016 | Luciani |
| 2016/0085993 | A1 | 3/2016 | Thibault et al. |
| 2016/0173347 | A1 | 6/2016 | Rajapakse |
| 2016/0224659 | A1 | 8/2016 | Robichaud |
| 2016/0231769 | A1 | 8/2016 | Doyle |
| 2016/0232044 | A1 | 8/2016 | Doyle |
| 2017/0017676 | A1 | 1/2017 | Levy et al. |

OTHER PUBLICATIONS

USPTO, Office Action for U.S. Appl. No. 14/618,257, dated Aug. 15, 2016.

USPTO, Final Office Action for U.S. Appl. No. 14/618,257, dated Jan. 9, 2017.

USPTO, Office Action for U.S. Appl. No. 14/618,257, dated Jun. 5, 2017.

USPTO, Final Office Action for U.S. Appl. No. 14/618,257, dated Oct. 4, 2017.

USPTO, Advisory Action for U.S. Appl. No. 14/618,257, dated Dec. 27, 2017.

USPTO, Office Action for U.S. Appl. No. 14/618,262, dated Feb. 11, 2016.

USPTO, Final Office Action for U.S. Appl. No. 14/618,262, dated Jul. 15, 2016.

USPTO, Office Action for U.S. Appl. No. 14/618,262, dated Dec. 21, 2016.

USPTO, Final Office Action for U.S. Appl. No. 14/618,262, dated Jun. 2, 2017.

USPTO, Advisory Action for U.S. Appl. No. 14/618,262, dated Sep. 23, 2016.

USPTO, Advisory Action for U.S. Appl. No. 14/618,262, dated Aug. 25, 2017.

USPTO, Notice of Allowance for U.S. Appl. No. 14/618,262, dated Sep. 21, 2017.

USPTO, Notice of Allowance for U.S. Appl. No. 14/618,262, dated Oct. 16, 2017.

USPTO, Notice of Allowance for U.S. Appl. No. 14/618,262, dated Oct. 24, 2017.

USPTO, Notice of Allowance for U.S. Appl. No. 14/618,262, dated Nov. 13, 2017.

Mollenkopf, Adam et al. "Applying Drools Fusion Complex Event Processing (CEP) for Real-Time Intelligence", JBossWorld 2009, FedEx Custom Critical, Sep. 2, 2009, 38 Pages, https://www.redhat.com/f/pdf/jbw/amollenkopf_430_applying_drools.pdf.

Tirelli, Edson, "Event Stream Processing, Complex Event Processing and Rules Engines", Drools & jBPM, May 6, 2007, 7 Pages http://blog.athico.com/2007/05/event-stream-processing-complex-event.html.

"Chapter 8. Complex Event Processing", jboss.org, Nov. 17, 2014, pp. 1-26 http://docs.jboss.org/drools/release/6.0.1.Final/drools-docs/html/DroolsComplexEventProcessingChapter.html.

"BRMS Complex Event Processisng Guide", Red Hat, Inc., Nov. 2014, pp. 1-24 https://access.redhat.com/documentation/en-US/JBoss_Enterprise_BRMS_Platform/5/html-single/BRMS_Complex_Event_Processing_Guide/index.html.

(56) References Cited

OTHER PUBLICATIONS

Eckert, Michael, "Complex Event Processing with XChangeEQ: Language Design, Formal Semantics, and Incremental Evaluation for Querying Events", Lidwig-Maximilians Universitat, Munchen, Oct. 22, 2008, pp. 1-275 http://www.en.pms.ifi.lmu.de/publications/dissertationen/Michael_Eckert/DISS_Michael.Eckert.pdf.

"Oracle Fusion Middleware Administrator's Guide for Oracle Complex Event Processing", Oracle, 11g Release 1 E14300-10, Aug. 2012, Parts 1-IV, https://docs.oracle.com/cd/E23943_01/admin.1111/e14300.pdf.

Malensek, M., et al., "Expressive Query Support for Multidimensional Data in Distributed Hash Tables", ACM Fifth International Conference on Utility and Cloud Computing, IEEE Computer Society, pp. 31-38, 2012.

* cited by examiner

FIG.1

```
rule "Baggage lost at sorting"
when
    $b1:BagScannedEvent( location == Location.CHECK_IN )
    not BagScannedEvent( bagTag == $b1.bagTag, location == Location.SORTING, this after[0s,10m] $b1 )
then
    System.out.println("Baggage lost at sorting");
end
```

IDEMPOTENT MODE OF EXECUTING COMMANDS TRIGGERED BY COMPLEX EVENT PROCESSING

RELATED APPLICATIONS

This application is a continuation of U.S. patent application Ser. No. 14/618,262 filed on Feb. 10, 2015, titled "Idempotent Mode of Executing Commands by Complex Event Processing," the entire content of which is incorporated by reference herein.

TECHNICAL FIELD

The present disclosure is generally related to computer systems, and is more specifically related to systems and methods for enforcing the idempotent mode of executing commands triggered by complex event processing.

BACKGROUND

"Complex event processing" herein shall refer to detecting, correlating, abstracting, aggregating, and/or reacting to certain events by an event processing system. In an illustrative example, an event processing system may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for enforcing the idempotent mode of executing commands triggered by complex event processing.

"Event" herein shall refer to an observable change of the state of a certain system at a particular point in time. In an illustrative example, an event may be represented by a luggage item arriving at the destination airport sorting facility. In another illustrative example, an event may be represented by a printer going off-line. "Event data item" herein shall represent a data item reflecting a certain event.

In certain implementations, an event data item may comprise a unique event identifier, an event timestamp, and values of one or more state variables.

"Complex event processing" herein shall refer to detecting, correlating, abstracting, aggregating, and/or reacting to certain events by an event processing system. In an illustrative example, an event processing system may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules. In an illustrative example, if a luggage item was scanned at the airport check-in desk and then was not, within a pre-defined period of time, scanned at the luggage sorting facility, a notification of the lost item should be displayed.

In certain implementations, an event processing system may comprise a plurality of event processing nodes configured to provide high availability (e.g., node failover) and/or load balancing among the nodes. "High availability" herein shall refer to a system design approach and associated system implementation that ensures a pre-defined level of operational performance of the system.

In an illustrative example, two or more event processing nodes may receive the same stream of event data items. Event processing may involve evaluating certain event processing rules against one or more event data items and performing one or more commands defined by the event processing rules. As executing the same command more than once may additively affect the system state, it may be desirable to ensure that no command is executed more than once (e.g., an event processing rule may implement a counter of events of a certain type, and a command triggered by the rule may actually increment the counter variable; when the same event is processed by two or more event processing nodes, the counter variable needs to be incremented only once). Such a command execution mode shall herein be referred to as the "idempotent mode" of command execution.

Aspects of the present disclosure address the above noted and other deficiencies by implementing a data structure (e.g., a hash table) employed to store identifiers of the commands that have been executed by the event processing system. The hash table may be implemented in a manner that prevents storing duplicate data items, by disallowing insertion in the hash table of a copy of a data item that has already been stored in the hash table.

A command dispatching module associated with an event processing node may thus be configured to attempt inserting an identifier of an incoming command into the hash table before causing the command to be executed. Responsive to successfully inserting the command identifier into the hash table, the command dispatching module may cause the command to be executed (e.g., by forwarding the command for execution to a command executing module or an external command executing system). Should the insertion of the command identifier into the hash table fail, the command dispatching module may discard the command.

Various aspects of the above referenced methods and systems are described in details herein below by way of examples, rather than by way of limitation.

Figure 1:
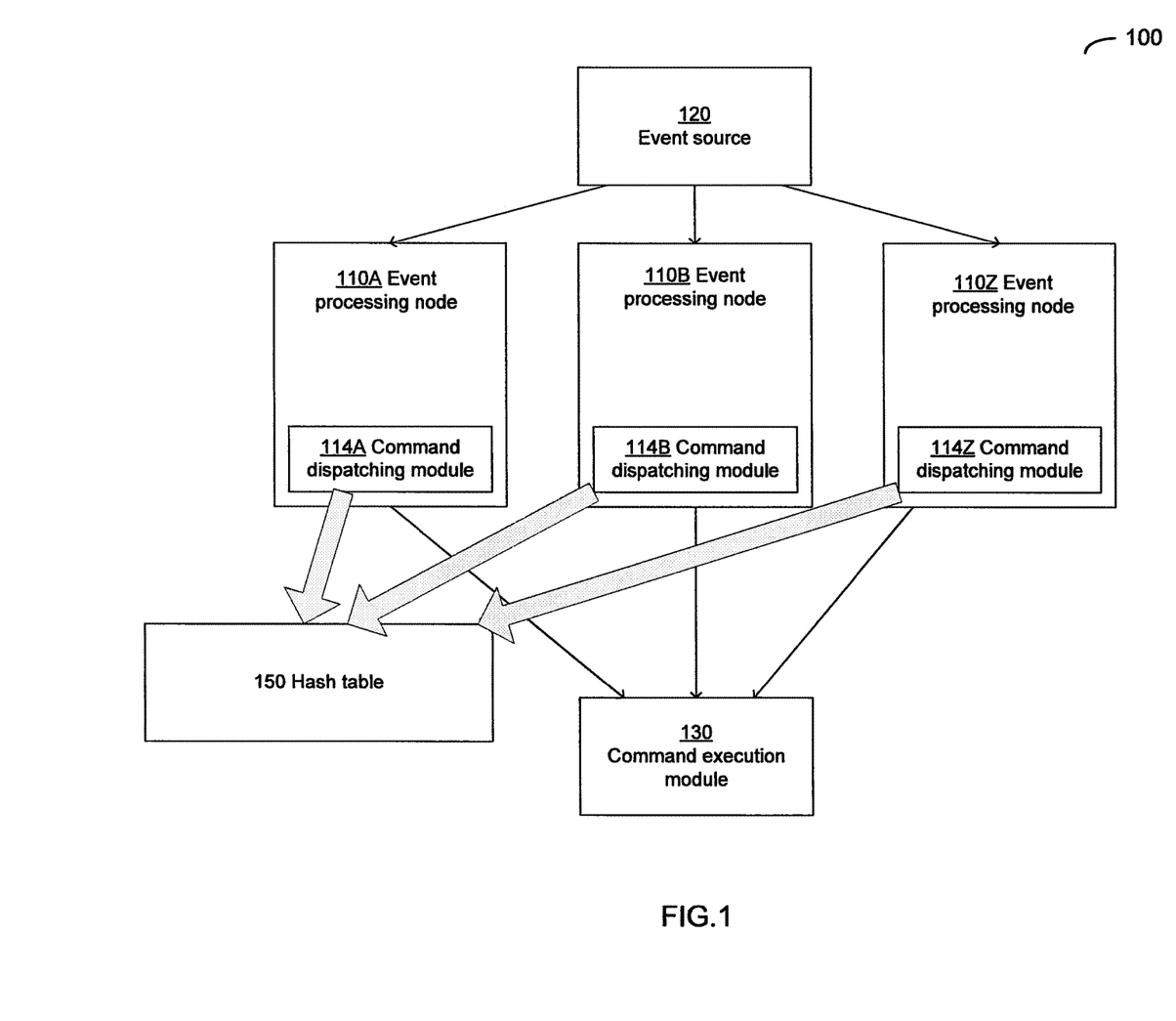
FIG. 1 depicts a high-level component diagram of an illustrative example of an event processing system 100 in accordance with one or more aspects of the present disclosure.

FIG. 1 depicts a high-level component diagram of an illustrative example of an event processing system 100 in accordance with one or more aspects of the present disclosure. Event processing system 100 may comprise a plurality of event processing nodes 110A-110Z. In certain implementations, an event processing node 110 may be represented by one or more computer systems running one or more event processing software modules. Alternatively, an event processing node may be represented by a virtual machine running one or more event processing software modules.

Event processing node 110 may be configured to receive event data items from the event source 120. Event source 120 may be represented, e.g., by one or more data sources, such as a messaging system, a database, a web service, a network socket, etc. In certain implementations, an event data item may comprise a unique event identifier, an event timestamp, and values of one or more state variables.

Event processing node 110 may be configured to process the received event data items. In an illustrative example, event processing node 110 may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules.

In various illustrative examples, an event processing rule may comprise a conditional statements associated with an action to be conditionally performed responsive to evaluating the conditional statement. The conditional statement may comprise values of one or more state variables, which may be comprised by one or more event data items.

Figure 2:
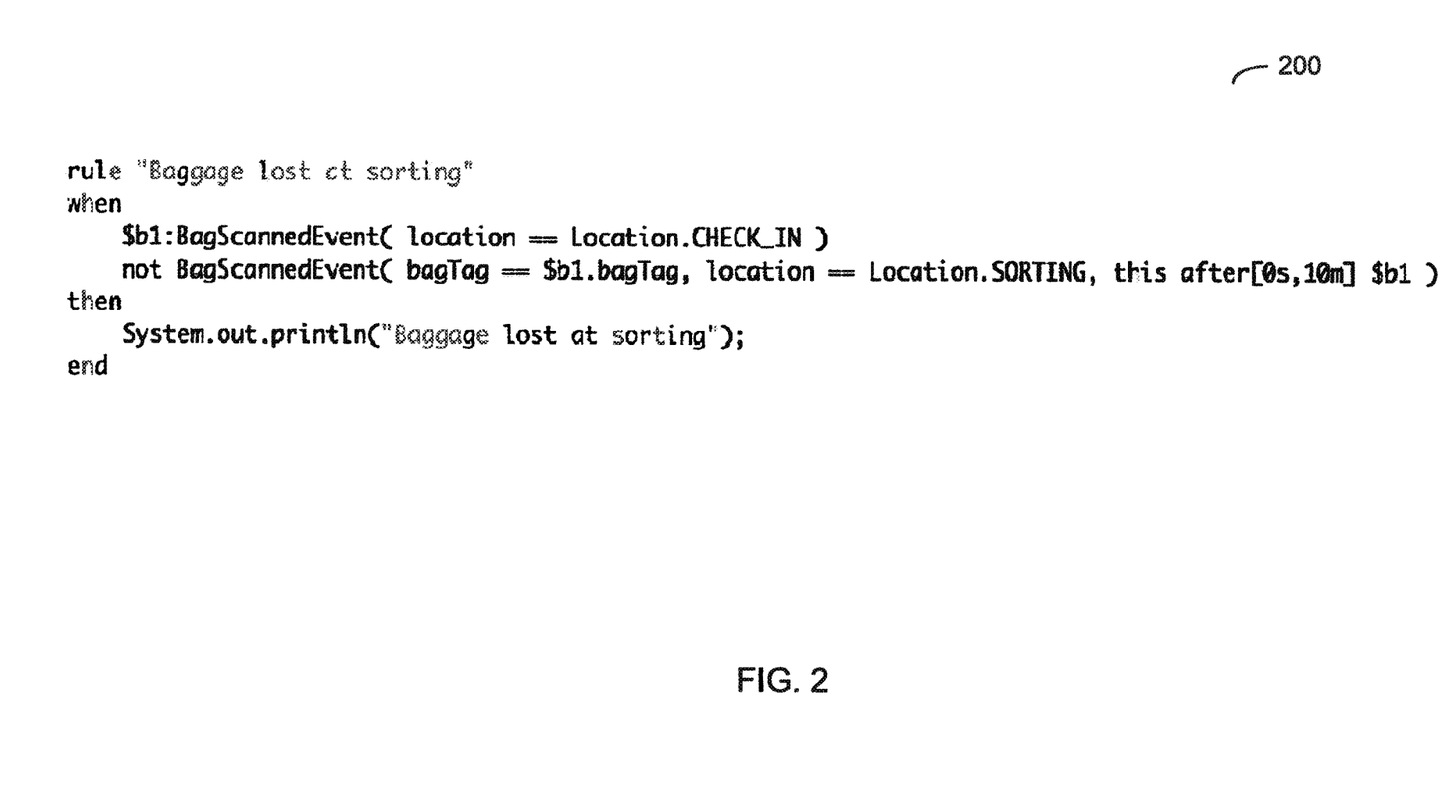
FIG. 2 illustrates an example of an event processing rule 200 to be applied by an event processing node, in accordance with one or more aspects of the present disclosure.

FIG. 2 illustrates an example of an event processing rule 200 to be applied by an event processing node, in accordance with one or more aspects of the present disclosure. In the illustrative example of FIG. 2, if a luggage item was scanned at the airport check-in desk and then was not, within a pre-defined period of time, scanned at the sorting facility, a notification of the lost item is displayed on the system console.

In certain implementations, an event processing rule may define an action to be performed in the form of one or more commands. A command may comprise a unique identifier which may be derived from the identifiers of one or more event processing rules that have produced the command and/or identifiers of one or more events that were processed by those event processing rules to produce the command. A command may further comprise a definition of an action to be performed (e.g., an identifier of a software module to be invoked and values of one or more parameters to be passed to the software module).

Referring again to FIG. 1, each event processing node 110A-110Z may comprise a command dispatching module 114 configured to forward the commands triggered by the event processing rules for execution to one or more command execution modules 130 or an external command execution system (not shown in FIG. 1). In various illustrative examples, a command dispatching module 114 may communicate to command execution module 130 or to an external command execution system using a representational state transfer (REST) protocol, such as HTTP, or other suitable protocol.

In accordance with one or more aspects of the present disclosure, command dispatching modules 114A-114Z may be configured to enforce the idempotent mode of executing commands triggered by complex event processing, as described in details herein below.

Event processing system 100 may comprise a data structure 150 employed to store identifiers of the commands that have been executed by the event processing system. In an illustrative example, data structure 150 may be implemented as a hash table that prevents storing duplicate data items, by disallowing insertion in the hash table of a copy of a data item that has already been stored in the hash table.

In certain implementations, command dispatching module 114 associated with an event processing node 110 may be configured to attempt inserting an identifier of an incoming command into hash table 150, before causing the command to be executed. Responsive to successfully inserting the command identifier into hash table 150, command dispatching module 114 may cause the command to be executed (e.g., by forwarding the command for execution to a command executing module 130 or an external command executing system). Should the insertion of the command identifier into the hash table fail, command dispatching module 114 may discard the command.

Thus, the idempotent mode of command execution is effectively enforced by command dispatching module 114 operating in accordance with one or more aspects of the present disclosure: should the same command be issued by two or more event processing nodes 110, only the first occurrence of the command would be successfully inserted into hash table 150 and then transmitted to command execution module 130, while other occurrences of the same command would be rejected by hash table 150 and hence dropped by command dispatching modules 114.

In certain implementations, employing command dispatching module 114 operating in accordance with one or more aspects of the present disclosure allows "replaying" a set of event data items by an event processing node, in order to synchronize the state of the event processing node with the state of other event processing system components. In an illustrative example, event processing module 110A may process a plurality of event data items reflecting a plurality of historic events, in order to synchronize its state with the state of event processing node 110B. The idempotent mode of command execution enforced by command dispatching modules 114 ensures that no command would be executed twice, thus making the replaying operation safe with respect to the system state.

While FIG. 1 illustrates allocating a dedicated command dispatching module 114 for each event processing node 110A-110Z, in other configurations two or more event processing nodes 110 may share a single command dispatching module 114.

Figure 3:
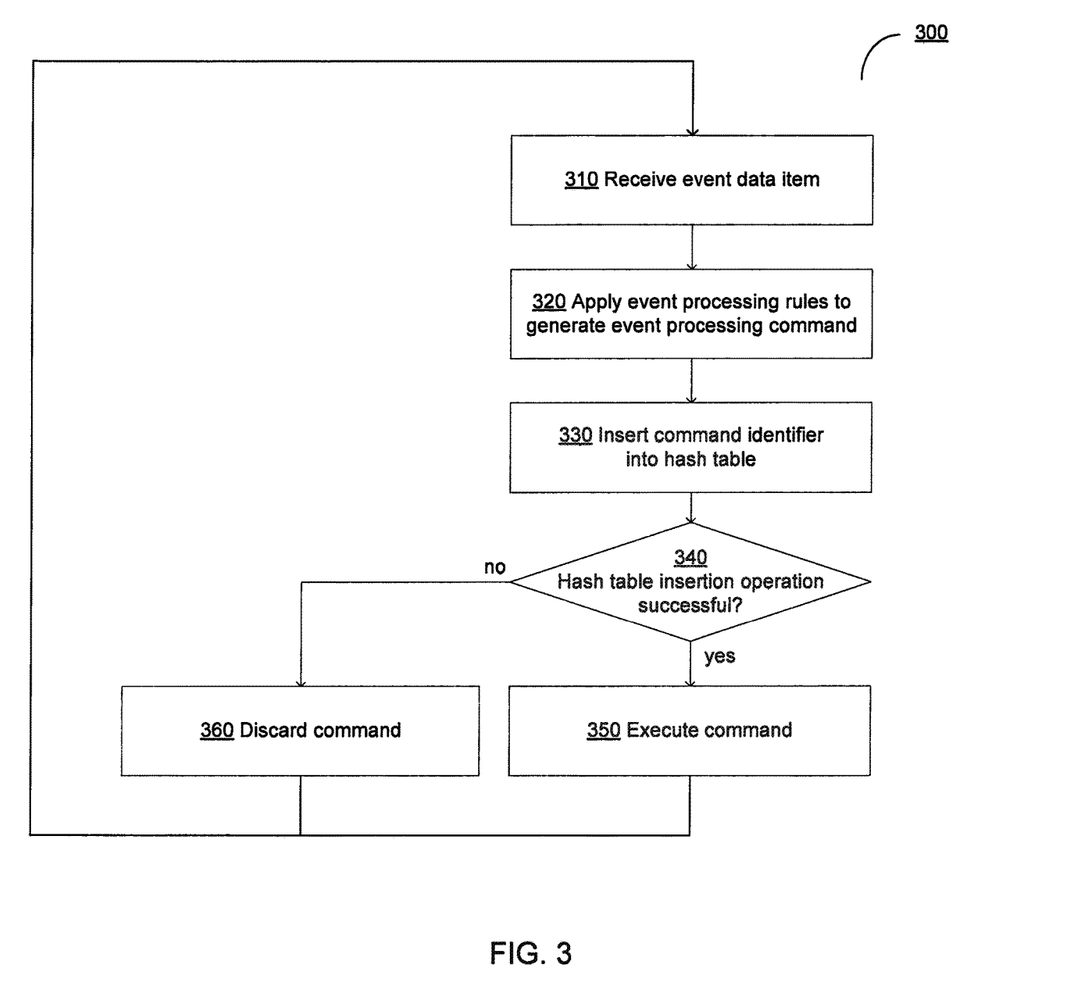
FIG. 3 depicts a flow diagram of a method for enforcing the idempotent mode of executing commands triggered by complex event processing, in accordance with one or more aspects of the present disclosure.

FIG. 3 depicts a flow diagram of one illustrative example of a method 300 for enforcing the idempotent mode of executing commands triggered by complex event processing, in accordance with one or more aspects of the present disclosure. Method 300 and/or each of its individual functions, routines, subroutines, or operations may be performed by one or more processing devices of the computer system (e.g., event processing nodes 110A-110Z of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of the event processing node implementing the method may receive an event data item from an event source. The event data item may reflect a change of the system state, and may comprise a unique event identifier, a timestamp, an one or more state variable values, as described in more details herein above.

At block 320, the processing device may evaluate one or more event processing rules against the event data item to generate one or more event processing commands. Each command may comprise a unique identifier which may be derived from the identifiers of one or more event processing rules that have produced the command and/or identifiers of one or more events that were processed by those event processing rules to produce the command. A command may further comprise a definition of an action to be performed (e.g., an identifier of a software module to be invoked and values of one or more parameters to be passed to the software module), as described in more details herein above.

At block 330, the processing device may attempt to insert the identifier of the generated command into a hash table employed to store identifiers of the commands that have been executed by the event processing system, as described in more details herein above.

Responsive to determining, at block 340, that the command identifier has been successfully inserted into the hash table, the processing may continue at block 350; otherwise, the method may branch to block 360.

At block 350, the processing device may cause the command to be executed (e.g., by forwarding the command for execution to a command executing module or an external command executing system), as described in more details herein above, and the method may loop back to block 310.

At block 360, the processing device may discard the command, and the method may loop back to block 310.

Figure 4:
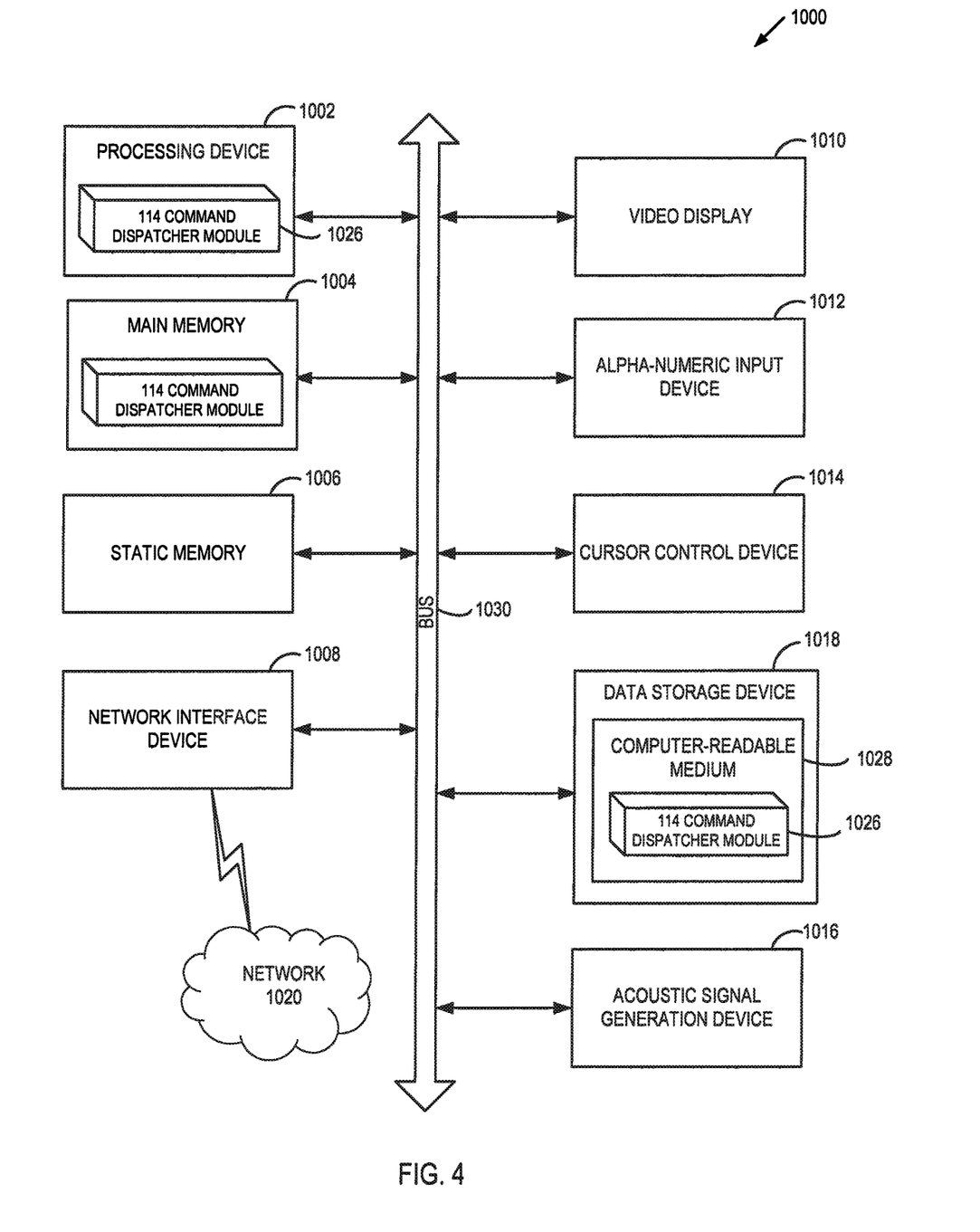
FIG. 4 depicts a block diagram of an illustrative computer system operating in accordance with examples of the invention.

FIG. 4 schematically illustrates a component diagram of an example event processing system 1000 which can perform any one or more of the methods described herein. In various illustrative examples, event processing system 1000 may represent event processing nodes 110 of FIG. 1.

Example event processing system 1000 may be connected to other computer systems in a LAN, an intranet, an extranet, and/or the Internet. Event processing system 1000 may operate in the capacity of a server in a client-server network environment. Event processing system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example event processing system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute command dispatching module 114 implementing method 300 for enforcing the idempotent mode of executing commands triggered by complex event processing.

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) or a block I/O device, such as a disk.

Example event processing system 1000 may further comprise a network interface device 1008, which may communicatively coupled to a network 1020. Example event processing system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of resource allocation component, including method 300 for enforcing the idempotent mode of executing commands triggered by complex event processing.

Executable instructions 1026 may also reside, completely or at least partially, within main memory 1004 and/or within processing device 1002 during execution thereof by example event processing system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    receiving, by a processing device, an event data item comprising a value of a state variable;
    applying an event processing rule to the event data item, by evaluating a conditional statement comprising the value of the state variable, to generate an event processing command;
    generating a command identifier identifying the event processing command, wherein the command identifier is derived from identifiers of one or more unique events and identifiers of one or more event processing rules, wherein the one or more unique events are processed by the one or more event processing rules to generate the event processing command;
    responsive to failing to insert the command identifier into a hash table employed for storing identifiers of executed commands:
        determining that the event processing command has been previously executed; and
        discarding the event processing command, wherein the hash table is indexed by the command identifier and the hash table is to reject duplicate command identifiers; and
    responsive to successfully inserting the command identifier into the hash table:
        determining that the event processing command has not been executed; and
        causing the event processing command to be executed.

2. The method of claim 1, further comprising:
    processing, by a first event processing node, a plurality of event data items reflecting a plurality of historic events, in order to synchronize a state of the first event processing node with a state of a second event processing node.

3. The method of claim 1, wherein the event processing command identifies a software module to be invoked and a value of a parameter to be passed to the software module.

4. The method of claim 1, further comprising:
    producing the event data item by correlating a first event and a second event in view of respective event timestamps.

5. A system comprising:
    a memory; and
    a processing device coupled to the memory, the processing device to:
        receive an event data item;
        apply an event processing rule to the event data item, to generate an event processing command;

generate a command identifier identifying the event processing command, wherein the command identifier is derived from identifiers of one or more unique events and identifiers of one or more event processing rules, wherein the one or more unique events are processed by the one or more event processing rules to generate the event processing command;

insert the command identifier into a hash table employed for storing identifiers of executed commands, wherein the command identifier is derived from one or more unique event identifiers and one or more event processing rule identifiers, and wherein the hash table is indexed by the command identifier and the hash table is to reject duplicate command identifiers; and responsive to successfully inserting the command identifier into the data structure:
- determine that the event processing command has not been executed, and
- cause the event processing command to be executed.

6. The system of claim 5, wherein the processing device is further to:
responsive to failing to insert the command identifier into the hash table, discard the event processing command.

7. The system of claim 5, wherein the event processing command identifies a software module to be invoked and a value of a parameter to be passed to the software module.

8. The system of claim 5, wherein the processing device is further to:
produce the event data item by correlating a first event and a second event in view of respective event timestamps.

9. A computer-readable non-transitory storage medium comprising executable instructions that, when executed by a processing device, cause the processing device to:

receive an event data item;

apply an event processing rule to the event data item, to generate an event processing command;

generate a command identifier identifying the event processing command, wherein the command identifier is derived from one or more unique event identifiers and one or more event processing rule identifiers, wherein the one or more unique events are processed by the one or more event processing rules to generate the event processing command;

responsive to failing to insert the command identifier into a hash table employed for storing identifiers of executed commands:
- determine that the event processing command has been previously executed, and
- discard the event processing command, wherein the hash table is indexed by the command identifier and the hash table is to reject duplicate command identifiers; and responsive to successfully inserting the command identifier into the hash table: determine that the event processing command has not been executed, and cause the event processing command to be executed.

10. The computer-readable non-transitory storage medium of claim 9, wherein the event processing command identifies a software module to be invoked and a value of a parameter to be passed to the software module.

11. The computer-readable non-transitory storage medium of claim 9, further comprising executable instructions to cause the processing device to:
produce the event data item by correlating a first event and a second event in view of respective event timestamps.

* * * * *